United States Patent
Chee

[19]

[11] Patent Number: 6,145,033
[45] Date of Patent: Nov. 7, 2000

[54] MANAGEMENT OF DISPLAY FIFO REQUESTS FOR DRAM ACCESS WHEREIN LOW PRIORITY REQUESTS ARE INITIATED WHEN FIFO LEVEL IS BELOW/EQUAL TO HIGH THRESHOLD VALUE

[75] Inventor: Lawrence Chee, Vancouver, Canada

[73] Assignee: Seiko Epson Corporation, Tokyo, Japan

[21] Appl. No.: 09/118,212

[22] Filed: Jul. 17, 1998

[51] Int. Cl.[7] .................................................. G06F 13/14
[52] U.S. Cl. ............................... 710/57; 710/52; 710/53; 710/60; 711/151; 711/158
[58] Field of Search ................................. 710/52, 53, 56, 710/57, 60; 703/223, 224, 207; 711/151, 158

[56] References Cited

U.S. PATENT DOCUMENTS

| | | | |
|---|---|---|---|
| 4,009,470 | 2/1977 | Danilenko et al. | 711/151 |
| 4,285,038 | 8/1981 | Suzuki et al. | 710/57 |
| 4,378,588 | 3/1983 | Katzman et al. | 710/57 |
| 4,453,214 | 6/1984 | Adcock | 710/114 |
| 4,486,854 | 12/1984 | Yuni | 711/100 |
| 4,845,661 | 7/1989 | Shimada | 345/516 |
| 4,847,812 | 7/1989 | Lodhi | 365/221 |
| 4,942,553 | 7/1990 | Dalrymple et al. | 710/57 |
| 4,953,101 | 8/1990 | Kelleher et al. | 345/505 |
| 4,991,112 | 2/1991 | Callemyn | 711/106 |
| 5,072,420 | 12/1991 | Conley et al. | 710/57 |
| 5,249,271 | 9/1993 | Hopkinson et al. | 710/57 |
| 5,293,474 | 3/1994 | Patil et al. | 707/518 |
| 5,295,246 | 3/1994 | Bischoff et al. | 710/34 |
| 5,317,709 | 5/1994 | Sugimoto | 711/105 |
| 5,329,615 | 7/1994 | Peaslee et al. | 345/502 |
| 5,329,630 | 7/1994 | Baldwin | 345/501 |
| 5,337,410 | 8/1994 | Appel | 345/501 |
| 5,345,577 | 9/1994 | Chan et al. | 711/106 |
| 5,349,449 | 9/1994 | Omi et al. | 358/448 |
| 5,371,849 | 12/1994 | Peaslee et al. | 345/501 |
| 5,450,542 | 9/1995 | Lehman et al. | 345/512 |
| 5,473,756 | 12/1995 | Traylor | 710/57 |
| 5,500,939 | 3/1996 | Kunihara | 345/502 |
| 5,673,416 | 9/1997 | Chee et al. | 711/151 |
| 5,771,356 | 6/1998 | Leger et al. | 709/233 |
| 5,818,468 | 10/1998 | Cornec et al. | 345/521 |
| 5,903,283 | 5/1999 | Selwan et al. | 345/521 |
| 5,974,482 | 10/1999 | Gerhart | 710/52 |

FOREIGN PATENT DOCUMENTS

| | | |
|---|---|---|
| 0 369 773 | 5/1990 | European Pat. Off. . |
| 0 255 436 | 5/1991 | European Pat. Off. . |
| 0 522 697 | 1/1997 | European Pat. Off. . |

OTHER PUBLICATIONS

Mar. 18, 1997 Written Opinion under PCT Rule 66 from IPEA/EPO PCT/US96/07373.

*Primary Examiner*—Thomas C. Lee
*Assistant Examiner*—Tammara Peyton
*Attorney, Agent, or Firm*—Mark P. Watson

[57] ABSTRACT

A display FIFO module is used in a DRAM interface. A low priority request and high priority request are both issued when the FIFO must receive new data or FIFO underrun will occur. This is determined by comparing the FIFO data level against a predetermined high threshold value. After a predetermined number of addresses have been latched by a DRAM controller sequencer to the DRAM for transferring data to the FIFO because of either the low or high priority request, or both, the display FIFO module reevaluates the FIFO data level to determine whether the FIFO data level is still below or is equal to either the low or high threshold value. If the FIFO data level is still below or equal to the low threshold value, the low priority request remains active; otherwise, the low priority request will be removed by the display FIFO module. Similarly, if the FIFO data level is still below or equal to the high threshold value, the high priority request remains active; otherwise, the high priority request will be removed by the display FIFO module.

13 Claims, 4 Drawing Sheets

MANAGEMENT OF DISPLAY FIFO REQUESTS FOR DRAM ACCESS WHEREIN LOW PRIORITY REQUESTS ARE INITIATED WHEN FIFO LEVEL IS BELOW/EQUAL TO HIGH THRESHOLD VALUE

CROSS REFERENCE TO RELATED APPLICATIONS AND PATENTS

This application is related to U.S. Pat. No. 5,673,416, issued to Chee et al. on Sep. 30, 1997, which is incorporated herein by reference in its entirety, and U.S. patent application Ser. No. 08/487,117, filed Jun. 7, 1995 by Chee et al., which is incorporated herein by reference in its entirety.

BACKGROUND OF THE INVENTION

This invention relates to first-in-first-out (FIFO) memory devices and more particularly to a display FIFO module that issues requests for display data to a dynamic random access memory (DRAM) controller sequencer which prioritizes DRAM access requests received from various modules.

In a DRAM interface, as shown in FIG. 1, a plurality of modules, including a display FIFO module 12, a CPU 14, a blit engine module 16, a half frame buffer logic module 18, and other modules, such as an nth module 20 are connected to a DRAM controller sequencer 22, which decides which one of the modules should be granted access to a DRAM 24. The blit engine module controls block transfer of bitmap images to, from or within the DRAM. The half frame buffer logic module supports display on a dual scan LCD panel. A DRAM address generator 52 is connected to DRAM controller sequencer 22 and display FIFO module 12. The DRAM address generator generates DRAM addresses to the DRAM controller sequencer. A CRT controller 50 controls DRAM address generator 52 and display pipeline 27. The CRT controller instructs the DRAM address generator when to start loading the FIFO. Display FIFO module 12 is connected between the DRAM controller sequencer 22 and a display pipeline 27 which is connected to a display device 26 such as a cathode ray tube (CRT) or liquid crystal display (LCD). Display FIFO module 12 is used for receiving and storing display data for the display device. When a FIFO in the display FIFO module is used to store display data received from DRAM 24, sometimes FIFO overrun may occur in which new data transferred to the FIFO exceeds its capacity so that some unread data in the FIFO will be overwritten by the new data. Also, FIFO underrun may occur when the FIFO runs out of display data and unintended data will be displayed on the display device. It is imperative to prevent both FIFO overrun and underrun conditions from occurring. At the same time, it is also desirable to improve the efficiency of the interaction between the various modules connected to the DRAM controller sequencer and the display FIFO module. For example, the CPU should not have to wait long for DRAM access while the display FIFO module is being serviced by the DRAM controller sequencer.

In devices such as that shown in FIG. 1, display FIFO module 12 issues a low priority request when the FIFO is ready to accept new data without overwriting unread data. The display FIFO module issues a high priority request when the FIFO must receive new data or FIFO underrun will occur. These requests are granted on a priority basis along with requests from the CPU and BLT engine requests as disclosed and described in U.S. Pat. No. 5,673,416, for example.

In certain prior art devices, due to the nature of the DRAM requests and the priority scheme used, there are long waiting periods during which the CPU has to wait for DRAM access. This results in inefficient CPU operations and slows down the computer system. This problem was addressed in U.S. Pat. No. 5,673,416 by increasing the time during which the low priority request is active. However, this can result in repetitive display FIFO requests as the FIFO data level oscillates around the low priority request threshold with the request being removed as the FIFO is filled above the threshold and then being reasserted as soon as the level drops below the threshold. In low power devices such as "hand-held" PCs, the resulting frequent memory accesses can be a significant power drain.

SUMMARY OF THE INVENTION

A principal object of the present invention is to reduce power consumption during static display in which there is no CPU activity, no BLT activity and no memory activity other than the memory activity required to draw a static image on a display. The present invention achieves this object by maximizing the use of long burst DRAM access, which effectively minimizes the time used to access the DRAM and maximizes idle periods between accesses. Reducing the time taken to access the DRAM reduces DRAM power consumption. Maximizing idle periods between accesses permits the controlling device to maximize a power savings mode. Any power savings is important in low-power devices such as battery powered laptop computers or "hand-held" PCs.

The present invention is directed to a display FIFO module that issues low and high priority requests for DRAM access to a DRAM controller sequencer for loading the FIFO with display data to be transferred to the display device. A high priority request is asserted when the FIFO must receive new data or a FIFO underrun condition will occur. This is determined by comparing the FIFO data level against a predetermined high priority threshold value. The high priority request is asserted when the FIFO data level is less than or equal to the high threshold value and is de-asserted when the FIFO level is greater than the high threshold value.

The low priority request is asserted when the FIFO is capable of accepting new data without overwriting unread data. In the present invention, the low priority request is issued when the FIFO data level falls below or is equal to the high threshold value and is de-asserted when the FIFO level is greater than a predetermined low threshold value. The hysteresis effect exhibited by the low priority request prevents it from being immediately re-asserted as soon as the FIFO level falls to the low threshold and prevents oscillation of the FIFO level about the low threshold value. In earlier devices, this oscillation translates into numerous requests for single memory accesses. The introduction of hysteresis on the low priority request results in the FIFO being emptied to the high priority threshold and eliminates the oscillation. Several single memory accesses are deferred into one long burst of memory access. This can save power in limiting the number of memory transfers (each of which uses power) and can created idle periods in which low-power devices can enter a power-savings mode.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
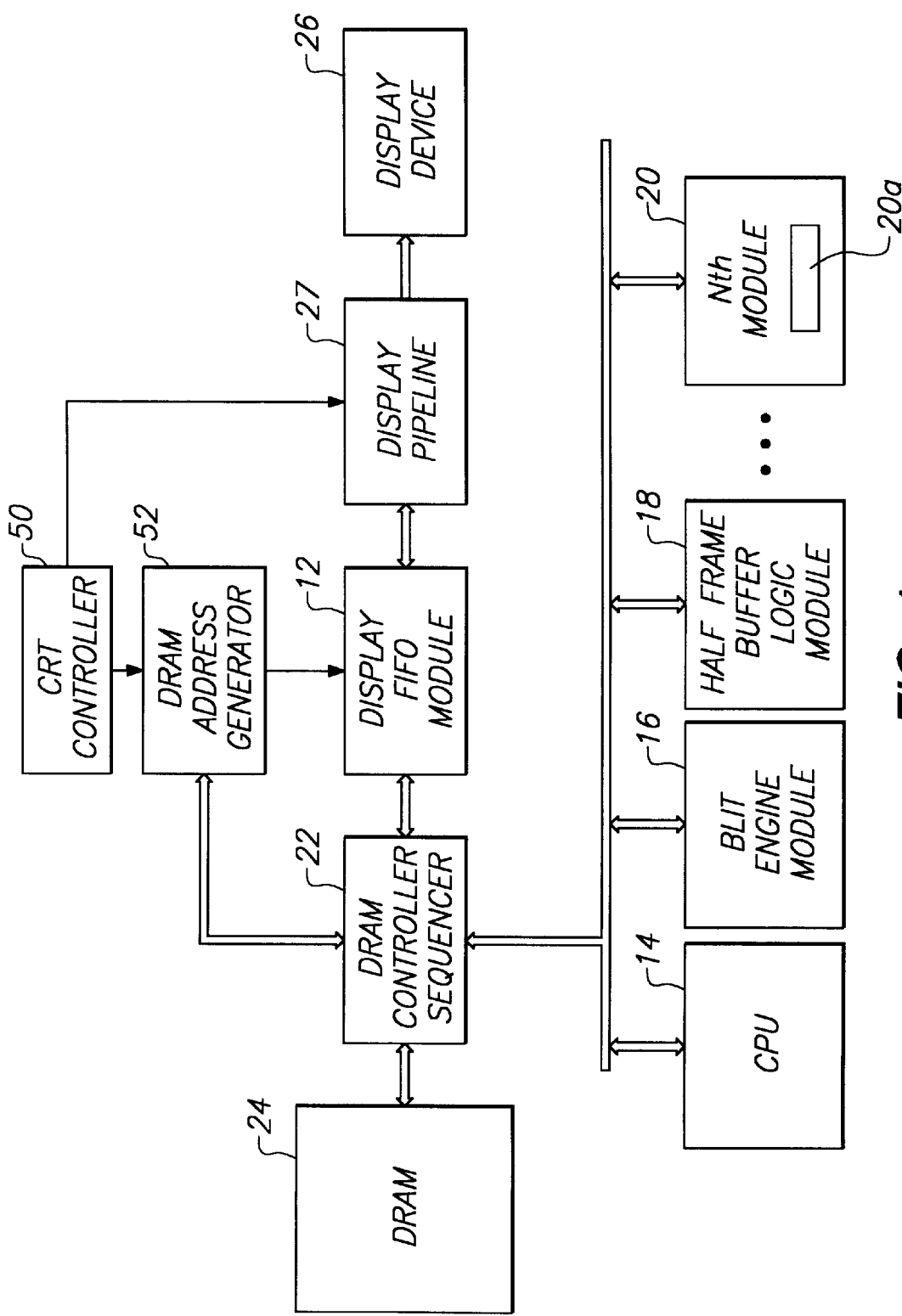
FIG. 1 is a block diagram of a DRAM interface having a number of modules, including the display FIFO module of the present invention, connected to a DRAM controller sequencer.

The general environment of the present invention is shown in FIG. 1, which was described above in the Background of the Invention.

The present invention will be described herein in terms of functional units. It will be appreciated that these functional units may be implemented with discrete components, application specific integrated circuits (ASICs), processors executing appropriate software and the like or any combination thereof. Software for operating the system shown in FIGS. 1 and 2 and/or for implementing the method of the present invention may be stored on a medium 20a, such as a hard disc, diskette or compact disc and input through a medium drive comprising Nth module 20, for example.

The display FIFO module of the invention includes a display FIFO, a read control circuit, and a write control circuit. The read control circuit accepts request for display data from a display pipeline for transferring data to a display device. The read control circuit generates read addresses to the FIFO for reading data out of the FIFO. An up/down counter in the write control circuit keeps track of the FIFO data level so that when a data element is about to be loaded into the FIFO, the up/down counter increments by 1 and when a request for data is received by the read control circuit from the display pipeline, the up/down counter decrements by 1. The value of the up/down counter is the FIFO level. The write control circuit uses the FIFO level to generate the low and high priority requests.

The low and high threshold values are preset in a threshold register. The threshold values are programmable and are preset depending on the display mode of the display device. By using preset threshold values, the write control circuit is simple and efficient in determining when to issue requests for DRAM access.

Figure 2:
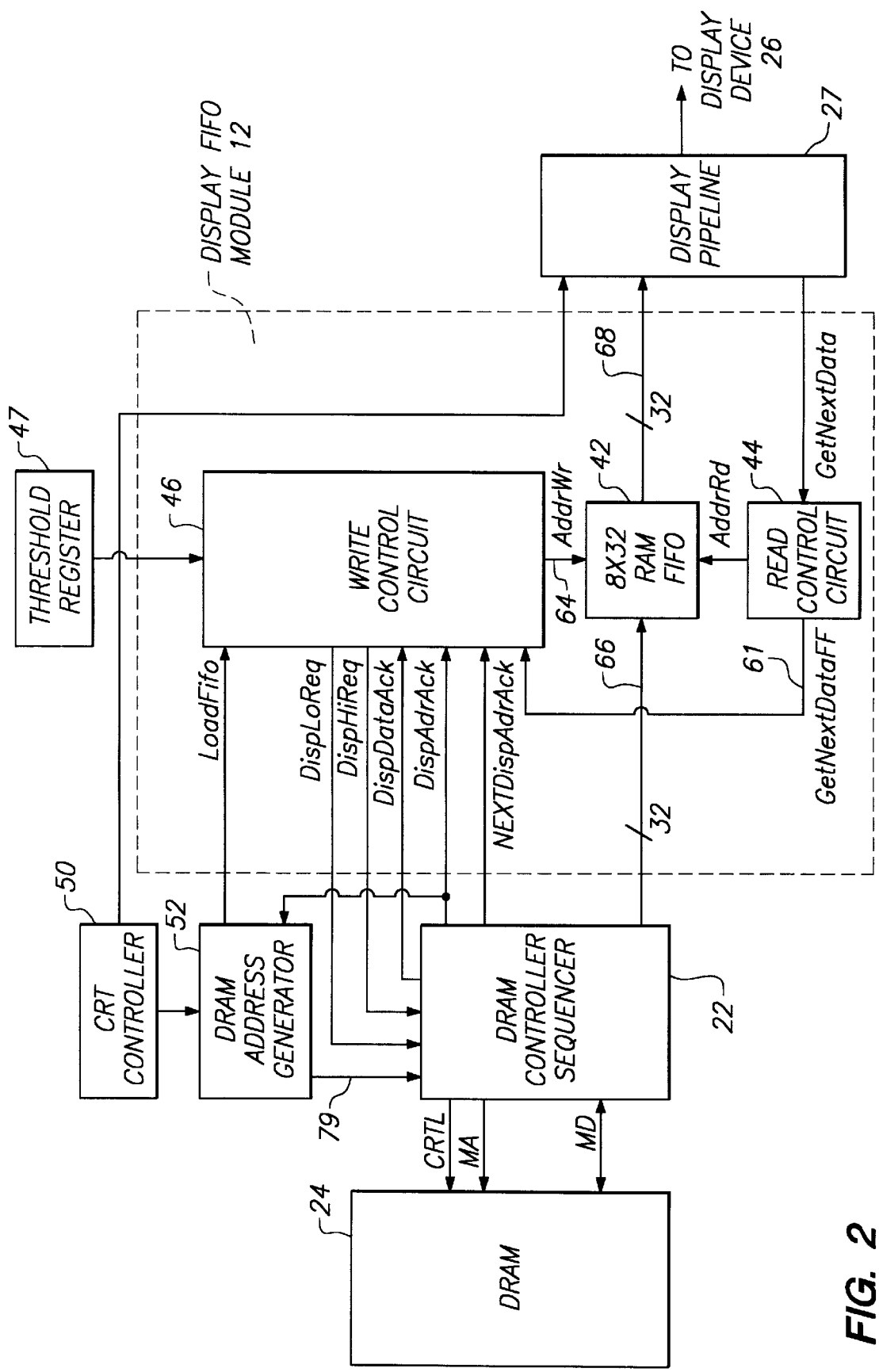
FIG. 2 shows a block diagram of the display FIFO module of the present invention which is connected between the DRAM controller sequencer and the display pipeline.

FIG. 2 shows a display FIFO module 12 of the present invention connected between DRAM controller sequencer 22 and display pipeline 27. In display FIFO module 12, a FIFO 42 is connected to a read control circuit 44 and a write control circuit 46. FIFO 42 is also connected to display pipeline 27. In this embodiment, FIFO 42 comprises conventional RAM cells of 8×32 bits, i.e., FIFO 42 has a capacity of eight data levels. FIFO 42 receives display data from DRAM controller sequencer 22 through data bus 66 and outputs display data to display pipeline 27 through data bus 68. Of course, FIFO 42 can be of other dimensions. Read control circuit 44 accepts a request for display data, GetNextData, from display pipeline 27 and generates read address AddrRd to FIFO 42, for reading data out of the FIFO. Then read control circuit 44 sends a GetNextDataFF signal to write control circuit 46. Read control circuit 44 is driven by a pixel clock of the display device.

Figure 3:
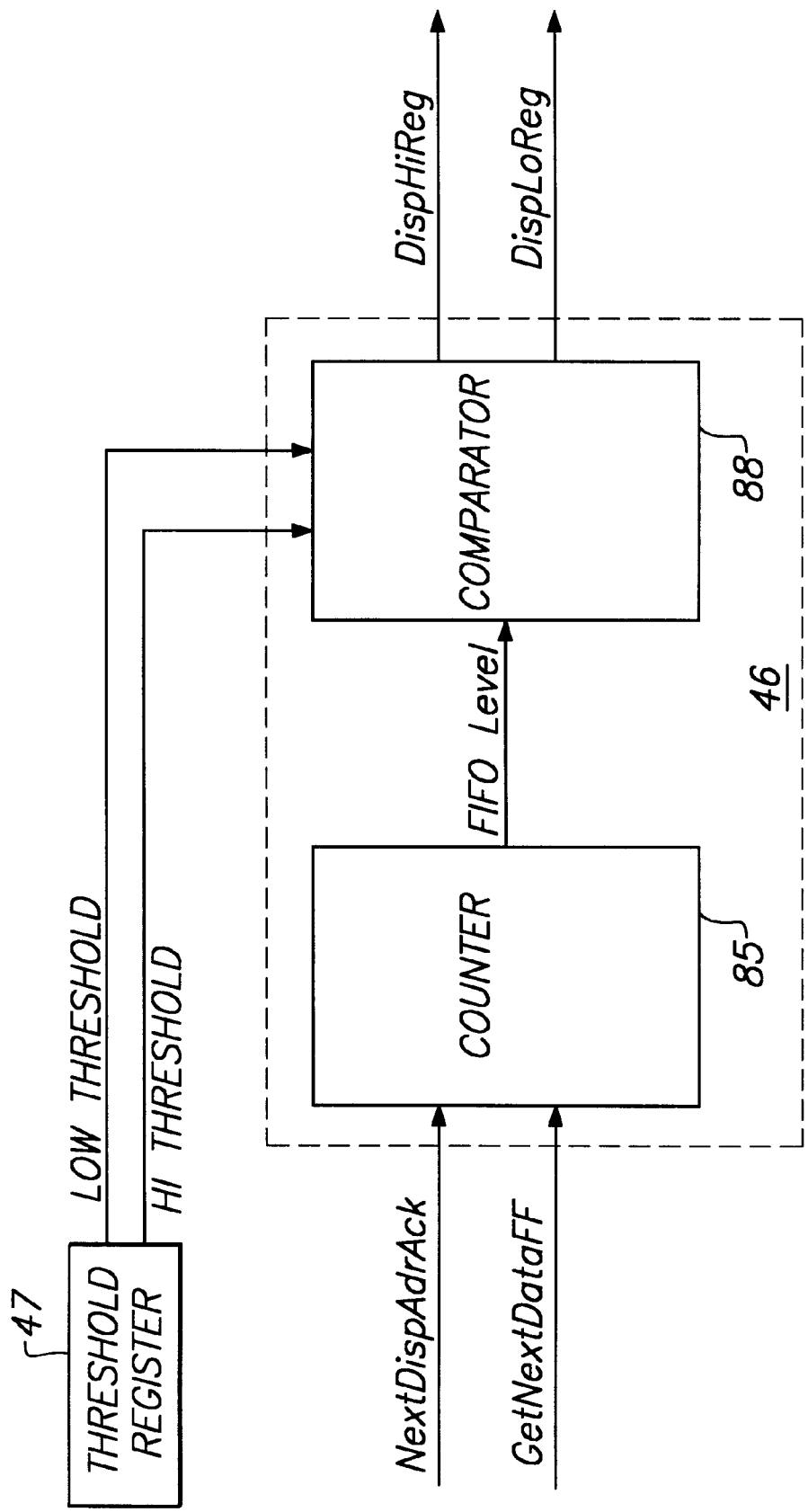
FIG. 3 is a block diagram of the write control circuit of the display FIFO module of the present invention.

Write control circuit shown in greater detail in FIG. 3 includes an up/down counter 85. The up/down counter is used to keep track of the current data level in FIFO 42. The up/down counter is incremented when a data element is about to be written into the FIFO and decremented when a request for display data is received by the read control circuit from the display pipeline. A NextDispAdrAck signal received from DRAM controller sequencer 22 is supplied to write control circuit 46 to increment the up/down counter by 1 when a data element is about to be written into FIFO 42 through data lines 66. The GetNextDataFF signal received from read control circuit 44 decrements the up/down counter by 1 after a read address AddrRd is generated.

Figure 4:
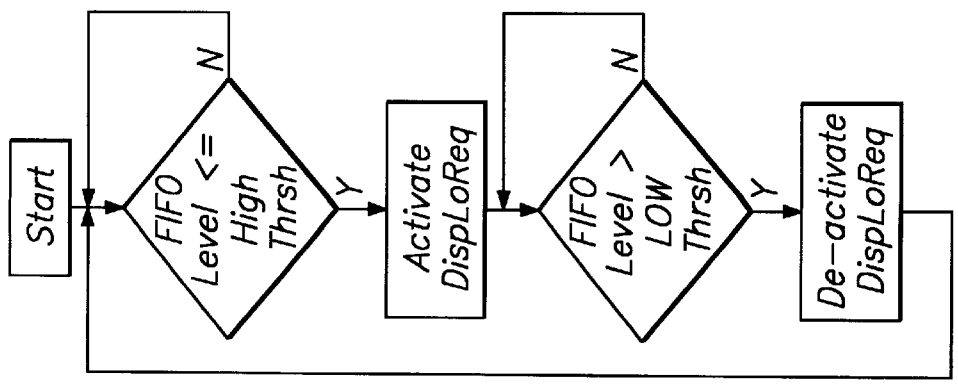
FIG. 4 is a flow diagram illustrating the sequence for activating and deactivating the low priority request.

A programmable threshold register 47, located in a register block, for example, provides predetermined low and high threshold values to comparator 88 of write control circuit 46 for comparing with the data level of the FIFO represented by the output of the up/down counter 85. Based upon the comparison, comparator 88 can issue two types of request for DRAM access: the low priority request and the high priority request. The low threshold value is set at a level such that the FIFO is capable of accepting new data without overwriting unread data However, in the present invention the low priority request is activated when the FIFO data level falls below or is equal to the high threshold value. This occurs at the time when the FIFO must receive new data or FIFO underrun will occur. The low priority request is deactivated when the FIFO level is greater than the low threshold value. The function of the comparator 88 in activating and deactivating the low priority request is illustrated in the flowchart of FIG. 4. Activating the low request at the high threshold and deactivating it at the low threshold results in a hysteresis effect on the low priority request and prevents the FIFO level from oscillating around the low threshold value during static display.

Figure 5:
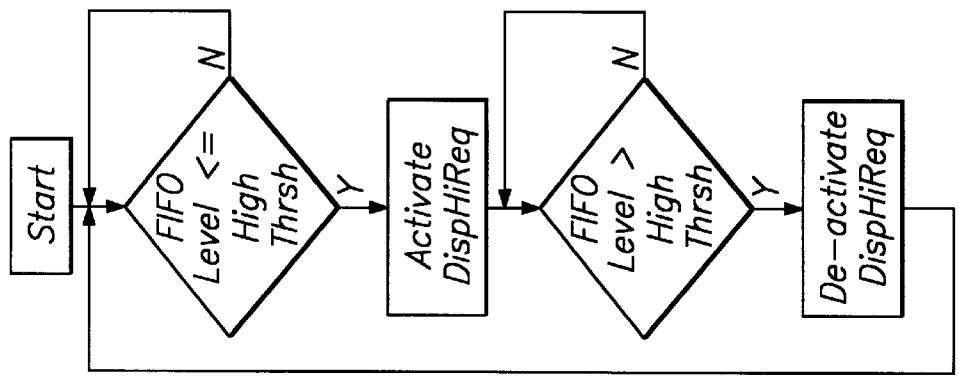
FIG. 5 is a flow diagram illustrating the sequence for activating and deactivating the high priority request.

The high priority request is issued when the FIFO data level falls below or is equal to the high threshold value and is deactivated when the FIFO level is greater than the high threshold value. The function of the comparator 88 in activating and deactivating the high priority request is illustrated in the flowchart of FIG. 5.

The low and high threshold values are preset in threshold register 47. The two threshold values are programmable depending on the display mode of display device 26, such as 16 color planar graphics mode, or 256 color packed pixel mode, etc. For a FIFO having a capacity of 8 data levels, the low threshold value has a range of 4 to 7; and the high threshold value has a range of 0 to 7. In one embodiment, the low threshold value is 4 and the high threshold value is 1.

Figure 6:
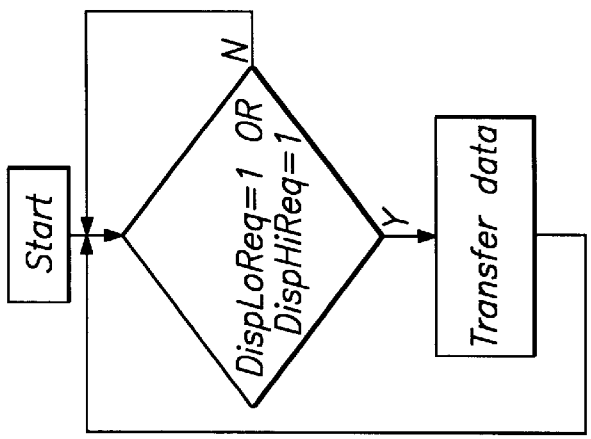
FIG. 6 is a flow diagram illustrating the sequence for transferring data to the FIFO.

Based upon the comparison of the FIFO data level against the threshold values, write control circuit 46 issues either a low priority request DispLoReq or a high priority request DispHiReq, or both, to DRAM controller sequencer 22 for DRAM access so that data can be loaded into FIFO 42, as illustrated by the flowchart in FIG. 6. After a predetermined number of addresses have been latched to the DRAM for transferring data to the FIFO, the write control circuit reevaluates whether any pending requests should remain active or be removed based on the comparison of the FIFO data level against the threshold values, as illustrated by the flowcharts in FIGS. 4 and 5.

Figure 7:
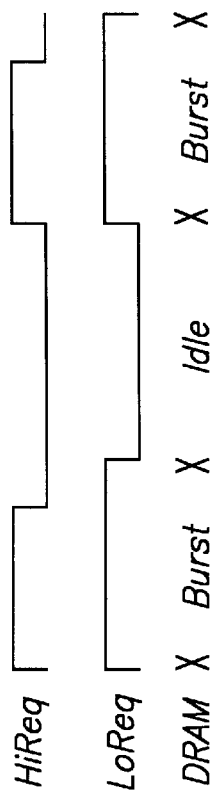
FIG. 7 is a timing diagram illustrating the relationship between the high and low priority requests and data transfer from the DRAM.

The introduction of hysteresis on the low priority request, as described above, results in the FIFO being emptied to the high priority threshold and eliminates oscillation of the FIFO level around the low threshold. Several single memory accesses are deferred into one long burst of memory access, as best shown in the timing diagram of FIG. 7. This can save power in limiting the number of memory transfers (each of which uses power) and can created idle periods during static display in which low-power devices can enter a power-savings mode While the invention has been described in conjunction with several specific embodiments, it is evident to those skilled in the art that many further alternatives, modifications and variations will be apparent in light of the foregoing description. Thus, the invention described herein is intended to embrace all such alternatives, modifications applications and variations as may fall within the spirit and scope of the appended claims.

What is claimed is:

1. Apparatus for requesting data transfer from a memory to a display FIFO during static display and for issuing prioritized requests including low priority requests and high priority requests for data for loading into said display FIFO, comprising:

a counter for tracking a FIFO data level of said FIFO;

a comparator, responsive to said counter, for comparing said FIFO data level against a predetermined low priority threshold value;

said comparator, responsive to said counter, for comparing said FIFO data level against a predetermined high priority threshold value lower than said low priority threshold value, said high priority threshold value representing a FIFO underrun threshold;

said comparator activating said low priority request for data when said FIFO data level falls below or is equal to said high priority threshold value and deactivating an issued low priority request for data when said FIFO data level is greater than said low priority threshold value;

said comparator activating said high priority request for data when said FIFO data level falls below or is equal to said high priority threshold value and deactivating an issued high priority request for data when said FIFO data level is greater than said high priority threshold value.

2. The apparatus of claim 1 wherein said low and high priority threshold values are programmable.

3. The apparatus of claim 1 wherein said low priority threshold value is preset such that when said FIFO data level falls below or is equal to said low priority threshold value said FIFO is capable of accepting data without overwriting unread data in said FIFO; and wherein said high priority threshold value is preset such that when said FIFO data level falls below or is equal to said high priority threshold value, the FIFO must receive data to avoid a FIFO underrun condition.

4. The apparatus of claim 1 wherein said counter comprises an up/down counter that increments when a data element is to be loaded into the FIFO and decrements when a data element is to be output by the FIFO, such that the output of said up/down counter represents said FIFO data level.

5. An information processor comprising a dynamic random access memory (DRAM), a memory request generator for asserting low and high priority requests for data to a dynamic random access memory (DRAM) controller sequencer for loading data from said DRAM into a first-in-first-out device (FIFO) for transfer to a display pipeline, said memory request generator comprising:

a counter for tracking a FIFO data level of said FIFO;

a comparator, responsive to said counter, for comparing said FIFO data level against a predetermined low priority threshold value;

said comparator, responsive to said counter, for comparing said FIFO data level against a predetermined high priority threshold value lower than said low priority threshold value, said high priority threshold value representing a FIFO underrun threshold;

said comparator activating said low priority request for data when said FIFO data level falls below or is equal to said high priority threshold value and deactivating an issued low priority request for data when said FIFO data level is greater than said low priority threshold value;

said comparator activating said high priority request for data when said FIFO data level falls below or is equal to said high priority threshold value and deactivating an issued high priority request for data when said FIFO data level is greater than said high priority threshold value; and wherein said DRAM controller sequencer is responsive to assertion of one of said low and high priority requests for transferring data from said DRAM to said FIFO.

6. The information processor of claim 5 wherein said low priority and high priority threshold values are programmable.

7. The information processor of claim 5 wherein said low priority threshold value is preset such that when the FIFO data level falls below or is equal to said low priority threshold value, said FIFO is capable of accepting data from said DRAM without overwriting unread data in said FIFO; and wherein said high priority threshold value is preset such that when said FIFO data level falls below or is equal to said high-priority threshold, the FIFO must receive data from said DRAM to avoid a FIFO underrun condition.

8. The information processor of claim 5 wherein said counter comprises an up/down counter which increments when an address has been latched by the DRAM controller sequencer for sending to the DRAM and decrements when receiving a request for reading data from the display pipeline, such that the output of said up/down counter coincides with the FIFO data level.

9. A method for requesting data transfer from a memory to a display FIFO during static display and for issuing prioritized requests including low priority requests and high priority requests for data for loading into said display FIFO, comprising:

tracking a FIFO data level of said FIFO;

comparing said FIFO data level against a predetermined low priority threshold value;

comparing said FIFO data level against a predetermined high priority threshold value lower than said low priority threshold value, said high priority threshold value representing a FIFO underrun threshold;

activating said low priority request for data when said FIFO data level falls below or is equal to said high priority threshold value and deactivating an issued low priority request for data when said FIFO data level is greater than said low priority threshold value;

activating said high priority request for data when said FIFO data level falls below or is equal to said high priority threshold value and deactivating an issued high priority request for data when said FIFO data level is greater than said high priority threshold value.

10. The method of claim 9 further comprising the step of programming said low and high priority threshold values.

11. The method of claim 9 further comprising the steps of:

presetting said low priority threshold value such that when said FIFO data level falls below or is equal to said low priority threshold value said FIFO is capable of accepting data without overwriting unread data in said FIFO; and presetting said high priority threshold value such that when said FIFO data level falls below or is equal to said high priority threshold value, the FIFO must receive data to avoid a FIFO underrun condition.

12. The method of claim 9 wherein said step of tracking said FIFO level comprises incrementing an up/down counter when a data element is to be loaded into the FIFO and decrementing said up/down counter when a data element is to be output by the FIFO, such that the output of said up/down counter represents said FIFO data level.

13. A medium readable by a machine embodying a program of instructions executable by said machine to perform a method for requesting data transfer from a memory to a display FIFO during static display and for issuing prioritized requests including low priority requests and high priority requests for data for loading into said display FIFO, said method comprising:

tracking a FIFO data level of said FIFO;

comparing said FIFO data level against a predetermined low priority threshold value;

comparing said FIFO data level against a predetermined high priority threshold value lower than said low priority threshold value, said high priority threshold value representing a FIFO underrun threshold;

activating said low priority request for data when said FIFO data level falls below or is equal to said high priority threshold value and deactivating an issued low priority request for data when said FIFO data level is greater than said low priority threshold value;

activating said high priority request for data when said FIFO data level falls below or is equal to said high priority threshold value and deactivating an issued high priority request for data when said FIFO data level is greater than said high priority threshold value.

* * * * *